Nov. 20, 1934.  F. J. SHOOK  1,981,828
METHOD AND APPARATUS FOR BUILDING TIRES
Filed April 28, 1932    8 Sheets-Sheet 7

INVENTOR
FLORAIN J. SHOOK

INVENTOR
FLORAIN J. SHOOK
BY
Ely & Barrow
ATTORNEYS

Patented Nov. 20, 1934

1,981,828

UNITED STATES PATENT OFFICE 1,981,828

METHOD AND APPARATUS FOR BUILDING TIRES

Florain J. Shook, Akron, Ohio, assignor to Paul A. Frank, Akron, Ohio

Application April 28, 1932, Serial No. 608,068

40 Claims. (Cl. 154—10)

This invention relates to methods and apparatus for building pneumatic tire casings, and more especially it relates to procedure and mechanism for stitching down the fabric plies of a tire carcase, in the bead regions thereof, during the fabrication of a tire.

The apparatus is designed for use with tire building machines that employ crowned or semiflat tire building forms or drums, and it is adapted for stitching the under-bead fabric plies down over the respective shoulders of the drum, turning up the under-bead fabric plies about the tire beads after the latter are mounted on the drum, and for stitching the over-bead fabric plies about the said beads.

The chief objects of the invention are to expedite the manufacture of pneumatic tire casings; to provide stitching apparatus of the character mentioned that is substantially automatic in operation; to produce improved tire casings; to provide stitching apparatus that will full or compact the fabric plies as it folds them into place; and to provide an improved method of operating upon the tire-carcase plies in the region of the tire beads. Other objects will be manifest.

Briefly the invention comprises a tire-building tool of novel design, and means for supporting the tool and for moving it into and out of engagement with the marginal portions of the fabric plies of a tire casing being built upon a rotatable form or drum. A complete tire building machine requires four of the improved tools of which two are turn-down tools employed for stitching the under-bead fabric plies about the respective tire-beads. The other two tools are employed for turning up and stitching the under-bead plies onto the tire-beads after the latter are mounted upon the drum. The four tools are essentially the same in their construction and function, but the mechanism for manipulating one set is somewhat different than that used with the other set. The tools are arranged in pairs on opposite sides of the drum so as to operate on the respective bead portions of the work, and as the respective mechanisms on opposite sides of the drum are identical, that on one side only will be shown and described.

Of the accompanying drawings.

Figures 4, 5, 6:
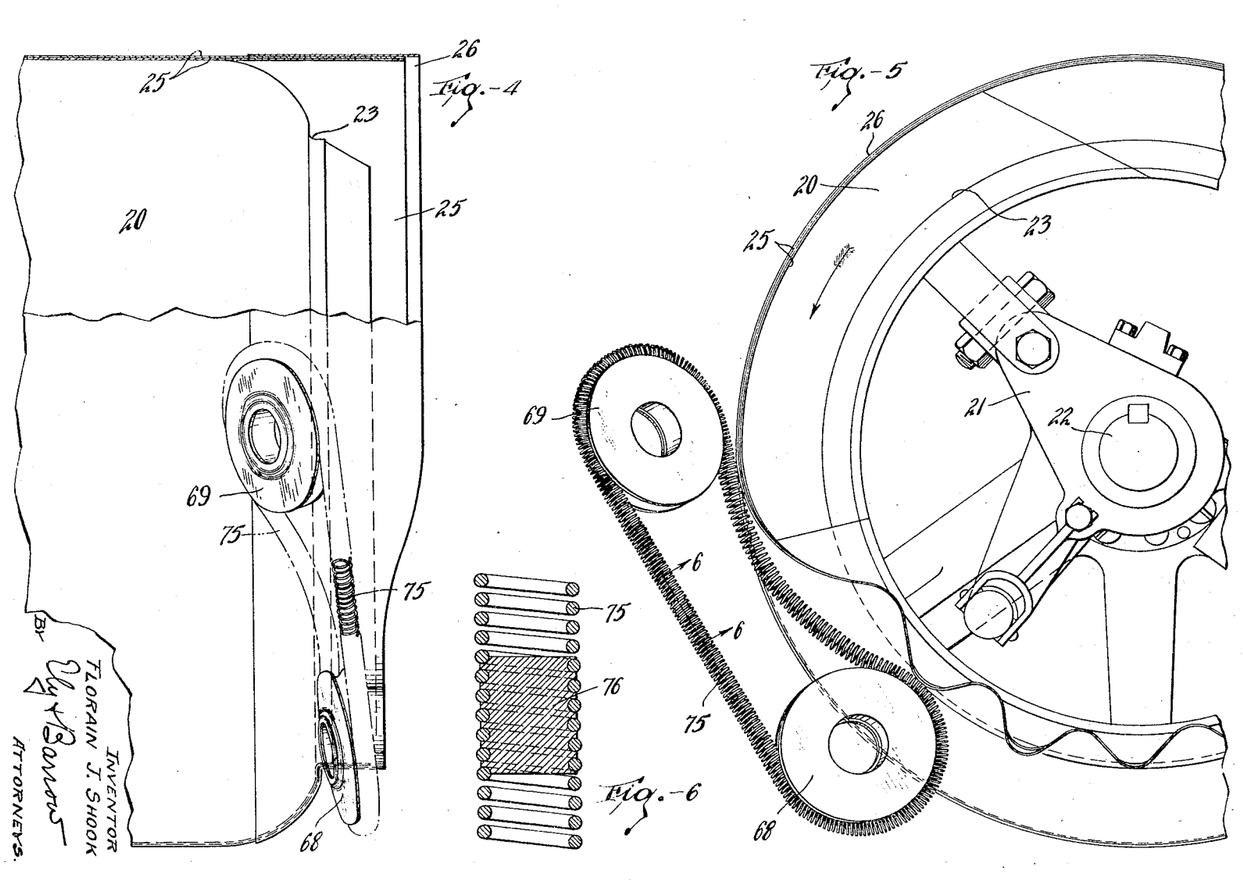
Figure 4 is a fragmentary detail, on a larger scale, showing a turn-down tool in operative association with the work.
Figure 5 is another view of the parts shown in Figure 4, as viewed from the right thereof.
Figure 6 is a section on the line 6—6 of Figure 5, on a larger scale.

Referring to the drawings, 20 is an annular, sectional, tire-building form or drum that is mounted upon a collapsible chuck 21, the latter being mounted upon a rotatable spindle 22 constituting a part of a tire building machine (not shown). The drum 20 is of the usual "shoulder" type having circumferential grooves or bead-seats 23, 23 of reduced diameter adjacent its lateral margins. The drum 20 is shown in Figures 4 and 5 with under-bead plies of tire fabric 25, 25 mounted thereon, and a flipper strip 26 mounted upon the marginal portion of the outermost ply 25. In Figures 9, 10, 11 and 12 a tire bead 27 is shown in place on a bead-seat portion 23 of the drum, and the said tire bead preferably is mounted upon the drum by the apparatus and in the manner described in my co-pending application for patent on Tire building method and apparatus, Serial No. 595,883, filed February 29, 1932.

Mounted upon the floor beneath the drum 20 is a base plate 30 which may be and preferably is integral with the base plate of the tire building machine. The base plate 30 supports two devices designated generally A and B of which device A comprises a pair of turn-down tools positioned to operate upon the respective bead portions of a tire casing being built upon the drum 20, and device B comprises a pair of similarly positioned turn-up tools.

Referring first to device A, there is provided a base-casting or housing 31 that is mounted upon a slideway 32 formed on the base plate 30. Journaled in the lower part of the housing 31 is a screw 33 that is threaded through a nut 34 that is fixedly mounted in a forked yoke 35 that is mounted at 36 in the base-casting 30. The arrangement is such that a crank (not shown) may be connected to one end of the screw 33, whereby the latter may be turned to move the base-casting 31 toward and/or away from the drum 20.

The upper portion of the base-casting 31 is extended laterally so as to extend beyond the lateral margins of the drum 20, and the top surface of the said casting is formed as a slideway 38 for a pair of carriages or slides 39, 39 that normally are aligned with opposite marginal portions of the drum 20. The top surface of the casting 31 is centrally slotted, as shown at 40, Figure 1, and the bottom face of each carriage 39 is formed with a pair of downwardly projecting forked lugs 41, 41 that extend through the slot 40 and between them embrace a nut 42. A screw 43 is journaled in the upper part of the base casting 31 and is formed with respective right and left hand threads that have threaded engagement with the nuts 42 of the respective carriages 39. The screw 43 has a squared end portion 44 exteriorly of the base-casting for the reception of a crank (not shown) by which the screw may be turned to move the carriages 39 concurrently toward and away from each other, whereby the carriages may be aligned with different size drums. The carriages 39 and mechanism carried thereby are identical so that a description of one will suffice for both.

Mounted upon the carriage 39 is a turntable 46, the under side of which is recessed to receive an annular boss 47 that is formed on the upper face of the said carriage, said boss constituting a pivot about which the turntable has limited rotary or angular movement. For limiting the angular movement of the turntable, the latter is formed with a pair of arcuate slots 48, 48 that are concentric with its axis, and respective bolts 49, 49 extend through said slots and are threaded into the carriage structure 39. At diametrically opposite points the turntable is formed with radially extending arms 50, 50, the end portions of which are upwardly turned and apertured so as to constitute journal brackets for a support and guide structure 51. The journals in the arms 50 are co-axial, and the axis thereof is horizontal, and transversely disposed with relation to the axis of the drum 20.

The support and guide structure 51 is pivotally supported by the turntable arms 50 upon pivot members 52, 52 in the journals thereof. Said structure is formed on opposite sides with laterally extending arms 53, 53, through the free ends of which are threaded respective set-screws 54, the latter providing means by which the structure 51 may be adjusted angularly upon the pivots 52. The structure 51 is formed with an arcuate guide slot 55 that is open at its top, and is disposed parallel to a plane passing through the pivot members 52.

Figure 1:
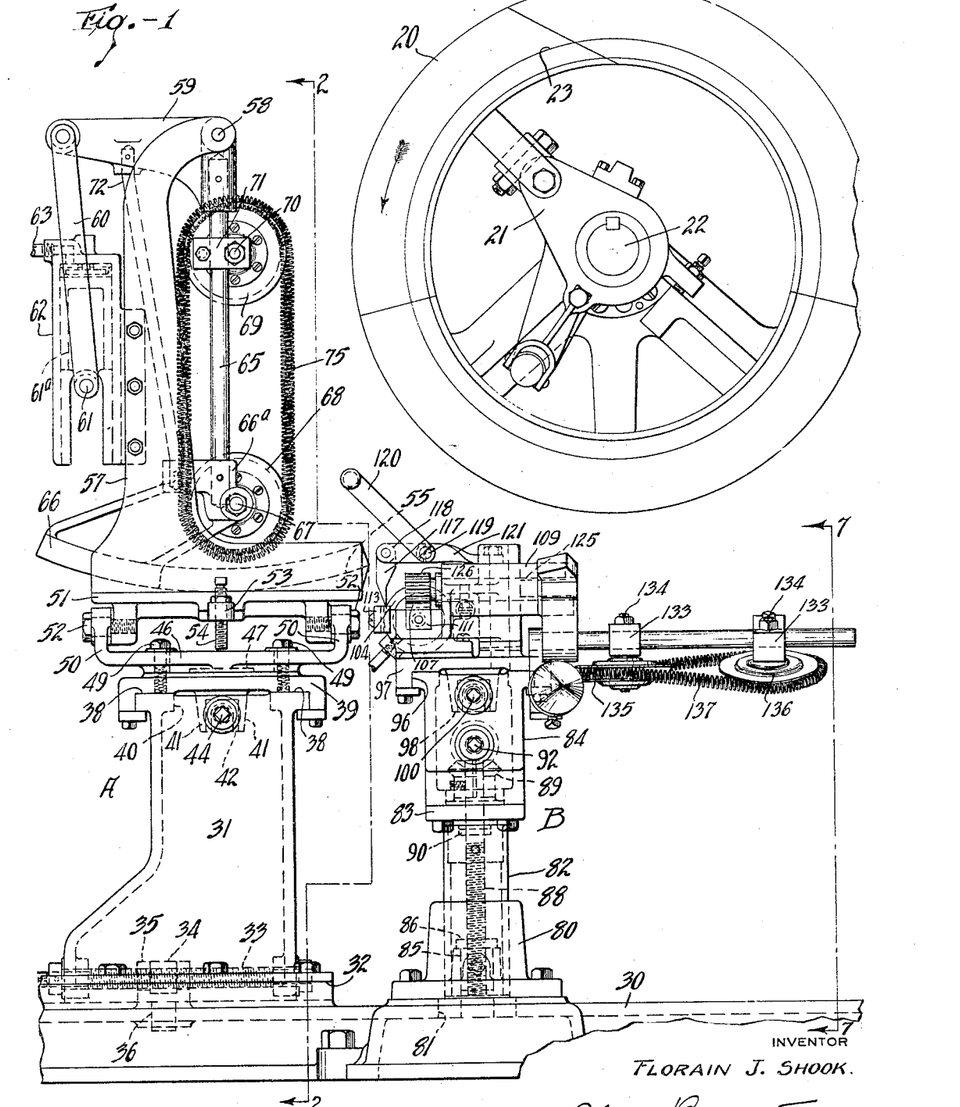
Figure 1 is a side elevation of apparatus embodying and adapted to carry out the invention, in its preferred form.
Figures 2, 3:
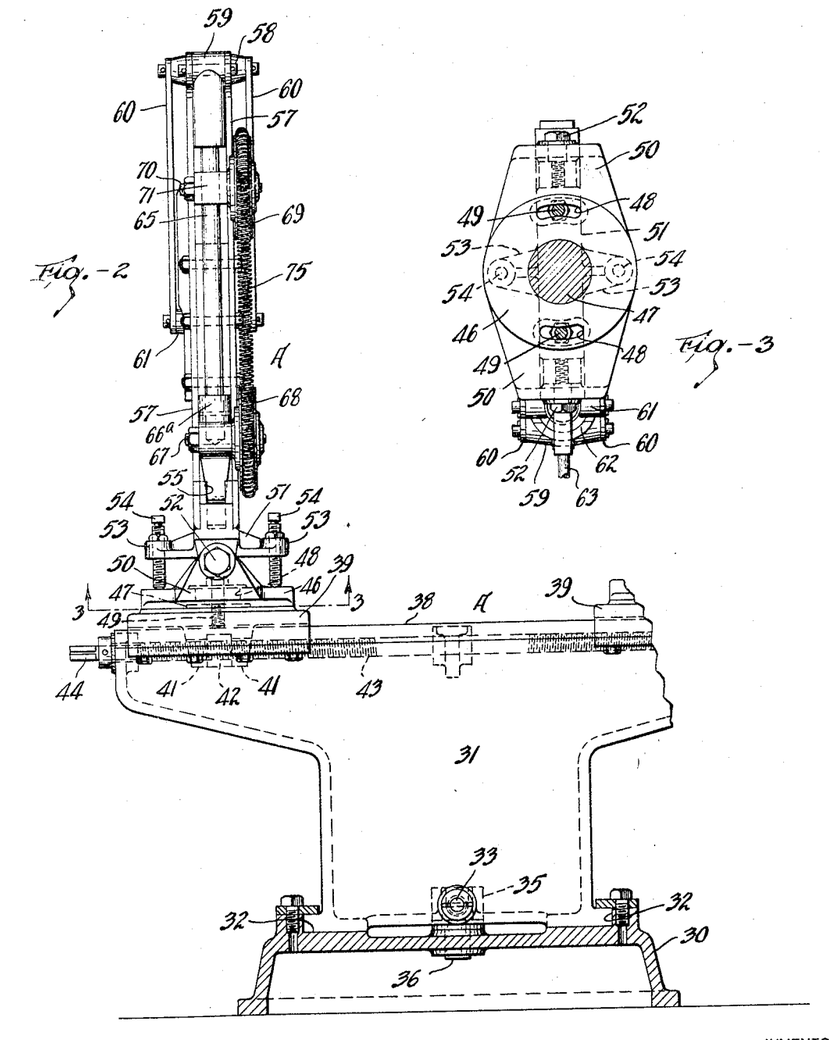
Figure 2 is a section on the line 2—2 of Figure 1, showing a front elevation of a turn-down tool and its operating mechanism.
Figure 3 is a section on the line 3—3 of Figure 2.

Rising from the support and guide structure 51 is a support or frame comprising a pair of parallel, spaced, side plates 57, 57 that are welded or otherwise secured to the structure 51 at opposite sides of the slot 55 therein. The upper end portions of the plates 57 are curved toward the drum 20, and carry a pivot pin 58 upon which is pivotally mounted a bell crank lever 59. One arm of the lever 59 extends rearwardly and is connected by a pair of links 60, 60 to a crosshead 61 formed upon the outer end of the piston 61ª of a one way fluid pressure operated cylinder 62 that is mounted upon the side plates 57. The cylinder 62 is provided with the usual fluid inlet and outlet pipe 63, the arrangement being such that the weight of the mechanism carried by the lever 59 restores it and the cylinder 62 to normal, inoperative position, as shown in Figure 1, when fluid is exhausted from the cylinder.

The other arm of the bell crank lever 59 carries a rod 65 that extends substantially downwardly and at its lower, free end carries a slipper 66 that is slidingly mounted in the slot 55, the length of the latter being such that the slipper remains in the slot in all positions of the lever 59. The slipper 66 is formed with a bearing bracket 66ª that carries a stub-shaft 67 on which is journaled a peripherally grooved sheave 68, and a similar sheave 69 is journaled upon a stub-shaft 70 that is mounted in a block 71 that is slidably mounted for angular and longitudinal adjustability upon the rod 65, at a suitable distance from the sheave 68. A brace 72 connecting the lever 59 to the slipper 66 is provided for strengthening the structure. The arrangement is such that the rod 65 is oscillated by the charging and discharging of the cylinder 62.

The sheaves 68, 69 carry one of the improved tire building tools 75 which consists of an endless, extensible structure made from a helical spring. The spring 75 is trained about the sheaves 68, 69, and has its ends joined by means of an exteriorly grooved coupling 76, Figure 6, the spring 75 normally being under sufficient tension to keep it taut. The adjustable character of the base member 31, carriage 39, turntable 46, support and guide structure 51, and the block 71, in combination with the lever 59 make it possible to move the tool 75 into operative relation to the work at practically any angular position desired.

The operation of the tool upon the work is best shown in Figures 4 and 5. It will be observed that the sheaves 68, 69 are disposed at suitable angles with relation to each other and to the work, and so offset from each other, that the tool 75 first engages the work where the shoulder of the drum is at its greatest diameter, and then follows down over said shoulder into the groove or bead-seat 23 of the drum. The effect of such application of the tool to the work is to bow and stretch or elongate the spring between the sheaves 68, 69 and thereby somewhat to open the coils thereof as is most clearly shown in Figure 5. The drum being rotated in the direction indicated by the arrow in Figure 5, the marginal portions of the fabric plies 25, 26 are carried into engagement with the tool 75 under the sheave 69, the drive of the work serving to move the tool along with the work and thus to rotate the sheaves 68, 69. The angle of the tool with relation to the movement of the work is such that the spring is caused to rotate on its longitudinal axis concurrently with its longitudinal movement along said axis, with the result that there is no sliding friction of the tool against the work, the latter being rolled down by the tool over the shoulder of the drum and pressed into the groove 23 thereof.

In addition to the rolling down of the fabric 25 upon the drum 20, the tool 75 also exerts a fulling or compacting effect upon the fabric plies so that they lie smoothly upon the rounded shoulder of the drum, and are pressed into the bead seat 23 of the drum without puckers or wrinkles, notwithstanding the diminished diameter of the bead seats as compared to the greatest diameter of the drum. The fulling action of the tool 75 is believed to be due to the fact that the sheave 69 is driven at slightly greater speed than the sheave 68, because of its position at the greatest diameter of the drum, and thus causes a moving together of the convolutions of the tool 75 in the reach thereof that is in operative engagement with the work. Since there is no slippage of the tool on the work, the result is to effect a desirable fulling effect upon the fabric 25. Laterally of the bead seat 23 the marginal portion of the fabric plies assumes a somewhat wavy appearance, as is shown in Figure 5, after the use of the tool 75. The turning down of the fabric plies as described requires but one revolution of the drum.

Referring now to the turn-up mechanism designated device B, there is provided a pair of base castings 80, 80 that are mounted in spaced apart relation upon the base plate 30 in front of the base member 31 of the device A. Each base casting 80 is formed with a vertical bore that is positioned over an aperture 81 in the base plate 30, and in said bore is slidably mounted a column 82. Upon the top of each column is a column-cap 83, and mounted upon said column caps is a hollow cross-rail 84 that is positioned parallel to the base-member 31 of the device A. Each base-casting 80 is formed with a vertical bore 85 in which is mounted a nut 86 that is secured therein by a cap-screw 87. Threaded into the nut 86 is the lower end portion of a screw 88, the upper end portion of which extends through the column cap 83 and is provided, interiorly of the cross-rail 84, with a bevel gear 89. The latter, and a collar 90 secured to the screw 88 below the column cap, prevent longitudinal movement of the screw with relation to said cap, so that by rotating the screws 88 the cross-rail 84 may be raised or lowered to move it toward and/or away from the drum 20.

For rotating the screws 88 in unison, a shaft 91 is journaled in the end walls of the cross-rail 84, extending from end to end of the latter and having one projecting end portion 92 that is squared to receive a suitable tool, such as a hand crank, by which the shaft is manually rotated. Interiorly of the cross-rail the shaft 91 is supported in journals formed in upward extensions 83ª, 83ª of the respective column caps 83, and bevel gears 93, 93 are mounted upon the shaft 91 in mesh with the respective bevel gears 89.

The top wall of the cross-rail 84 is centrally recessed or slotted at 95, and laterally of said slot is formed longitudinally with a slideway 96 for a pair of slides or carriages 97, 97. The latter are positioned equi-distant each side of the middle of the cross-rail, and each has a pair of spaced-apart slotted lugs 98, 98 projecting downwardly through the slot 95, said lugs between them embracing a nut 99. The nuts 99 of the respective carriages 97 have threaded engagement with respective right and left hand threads on a screw 100 that is journaled in the cross-rail 84 parallel to the shaft 91, one end of the screw 100 extending exteriorly of the cross-rail and being squared at 101 to receive a suitable turning tool such as a crank. The arrangement is such that the carriages 97 may be moved from and toward each other, and laterally with relation to the drum 20. Since the carriages 97 and mechanism carried thereby are identical, a description of one will suffice for both.

Mounted upon the carriage 97 is a one-way fluid pressure operated cylinder 104 that is horizontally disposed with its open end directed away from the center of the cross-rail. The cylinder 104 has a piston 105 and in lieu of a piston rod has a pair of links 106 pivotally connected thereto. The outer ends of the links 106 are pivotally connected to one end of a toothed rack 107 that is slidably mounted in a slideway 108 formed in a lever member 109 that is swivelled at 110 on the carriage 97. The far end of the slideway 108 is closed by a plate 111, and a compression spring 112 is mounted between said plate and the rack 107, being partly housed in a suitable bore in the end of the latter. The lever 109 normally is angularly positioned with rack 107 parallel to the axis of the cylinder 104, being so held by a latch 113 that is mounted upon a leaf spring 114 and that engages an offset lug 115 formed on said lever member, as is most clearly shown in Figures 8 and 9. A tension spring 116 is connected to the lever 109 and to a stud projecting from the cylinder 104 in such a manner as normally to urge the said lever toward the normal angular position described.

The latch 113 is arranged to be disengaged from the lug 115 by means of a cam or wedge plate 117 that is movable between the side face of the cylinder 104 and the latch 113 to raise the latter. As is most clearly shown in Figure 1, the wedge plate 117 is connected at its upper end to a lever 118 that projects horizontally from a shaft 119, and the latter is provided with a crank 120 for rocking it. The shaft 119 is journaled at one end in a bearing bracket 121 mounted upon the carriage 97, and at its other end is slidably mounted in a tubular sleeve 122 that connects it with the shaft 119 of the other turn-up unit. Both shafts 119 are pinned to the sleeve 122 by respective pins 123 so that the rotating of one shaft 119 concurrently rotates the other, and the ends of pins 123 extend into respective slots or keyways 124 formed longitudinally in the sleeve 122 to permit movement of the shafts from and toward each other as the carriages 97 are so moved, upon occasion, as when the turn-up mechanism is adjusted laterally to operate upon a drum 20 of different width.

The lever member 109 is formed with a bearing bracket that is transversely disposed to the pivot 110, and journaled therein is a shaft 125 upon one end of which is mounted a pinion 126 meshed with the rack 107. On the other end of the shaft 125 is pinned a lever 127 that is formed with a radially extending lug 128 that constitutes a locking tenon as presently will be described. Carried by the lever 127 is an elongate rod 129 that is disposed parallel to the shaft 125, a short portion of the said rod projecting rearwardly of the lever, but the greater portion of the rod extending forwardly of the lever. Mounted upon the rearwardly projecting portion of the rod 129, close to the lever 127, is a bracket arm 130 that carries an adjustable spindle 131 upon one end of which is swivelled a conical tool or plow 132. Upon the forwardly extending portion of the rod are adjustably mounted a pair of spaced apart blocks 133, 133 that carry respective spindles 134, 134 upon which are journaled respective peripherally grooved sheaves 135, 136. Trained about said sheaves is an endless, extensible, turn-up tool 137 consisting of a helical spring that is mounted under tension. The tool 137 is similar in all respects to the turn-down tool 75.

The carriage 97 is formed with a flat, horizontal, guiding surface 140 that is arcuate and concentric with the pivot 110. Mounted upon the carriage above the surface 140 and spaced therefrom is a concentric, arcuate, guide plate 141 that is somewhat shorter than the surface 140 so as to leave a portion of the latter in projecting position as is most clearly shown in Figure 8. The space between the surface 140 and plate 141 receives the tenon 128 of the lever 127, during the operation of the device, for rigidly supporting said lever as presently will be described.

Figure 7:
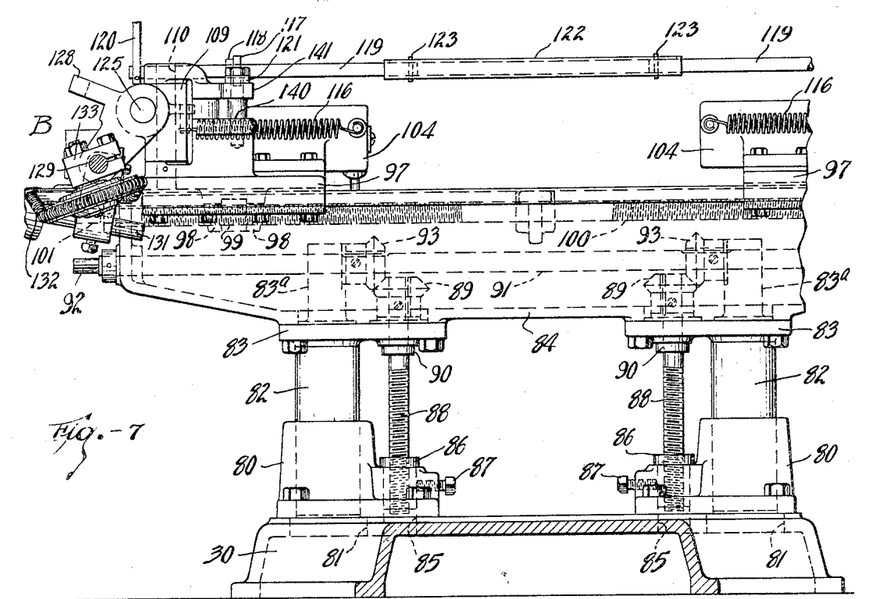
Figure 7 is a section on the line 7—7 of Figure 1 showing a front elevation of the operating mechanism of the turn-up tools.
Figure 8:
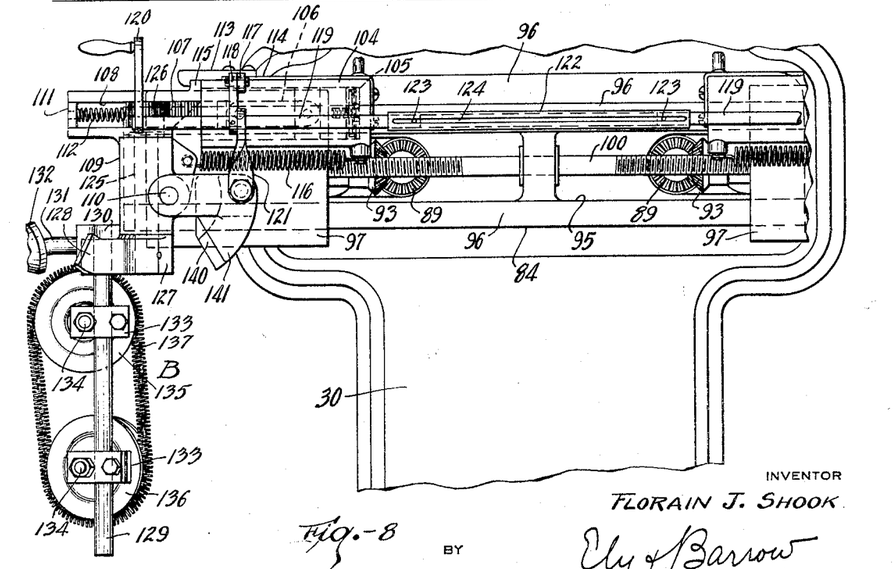
Figure 8 is a plan view thereof.
Figure 13:
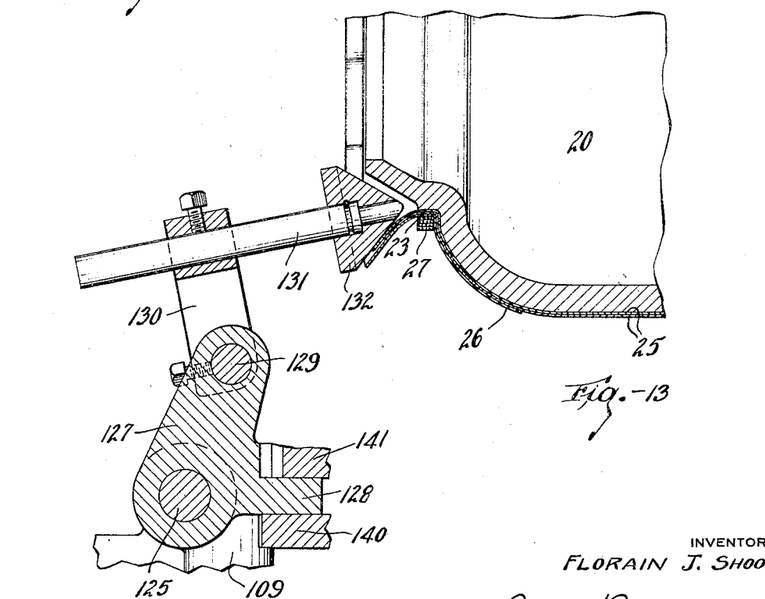
Figure 13 is a section on the line 13—13 of Figure 10.

In the operation of the turn-up mechanism, the parts initially being in the inoperative positions shown in Figures 1, 7 and 8 fluid pressure is admitted to the cylinder 104 to project the piston 105 thereof outwardly, whereby the rack 107 is moved outwardly in its slide, against the compression of spring 112, until brought to rest against plate 111, at which time the piston 105 is disposed about midway between the ends of cylinder 104. Movement of the rack 107 acting through the pinion 126 rotates the shaft 125 whereby the lever 127 thereon is similarly rotated and the projecting lug or tenon thereon brought to rest upon the projecting portion of the guiding surface 140, as is most clearly shown in Figure 9. The rotary movement of the lever 127 imparts orbital movement to the rod 129 which moves the mechanisms mounted thereon into the position shown in said figure, the plow 132 entering the space between the margins of the fabric plies 25, 26 and the surface of the drum 20, and turning up said fabric margins as shown in Figure 13 so as to permit the subsequent entry of the tool 137.

Figure 10:
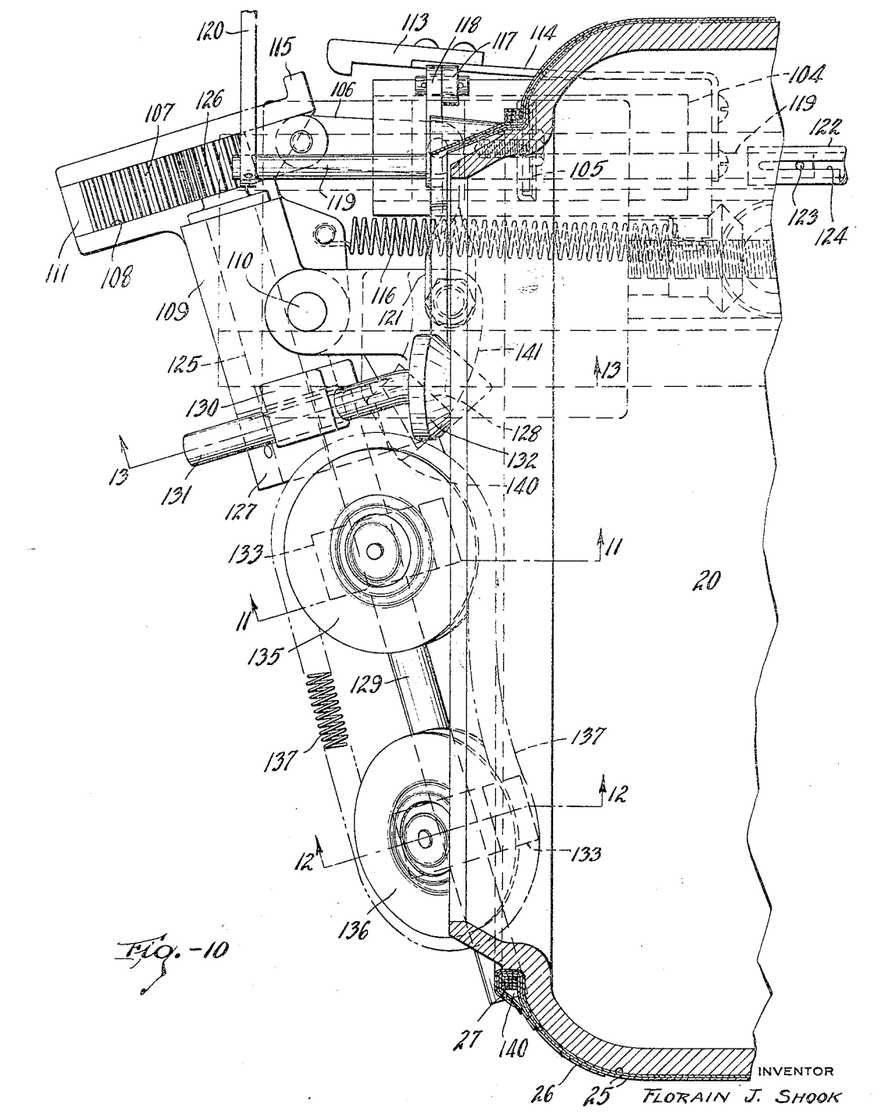
Figure 10 is a view of the parts shown in Figure 9 at a subsequent stage of operation, the turn-up tool being engaged with the work.

The operator then depresses the crank 120 which causes the wedge 117 to move the latch 113 out of engagement with the lug 115 of the lever 109, whereupon the fluid pressure in cylinder 104 further projects the piston 105 and causes the lever 109 to swing on its pivot 110 against the tension of spring 116 to the angular position shown in Figure 10, this movement of the lever 109 being possible by reason of the link connection between the piston 105 and the rack 107.

Figure 11:
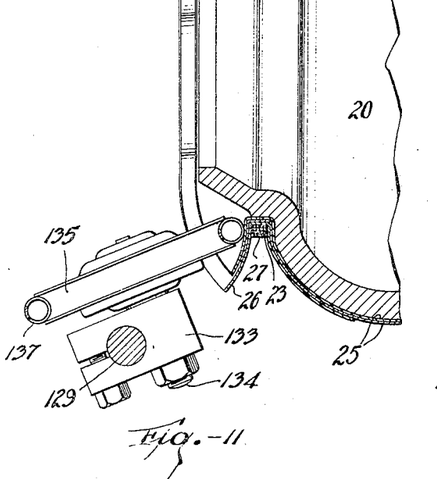
Figure 11 is a section on the line 11—11 of Figure 10.
Figure 12:
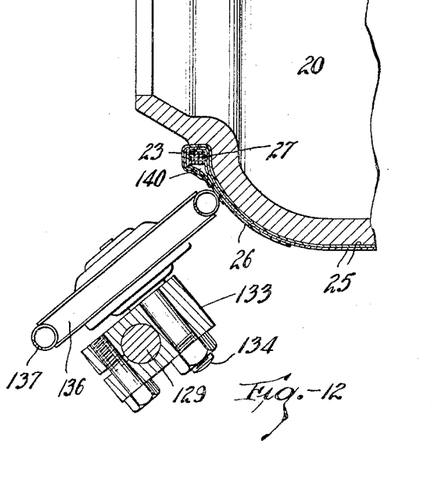
Figure 12 is a section on the line 12—12 of Figure 10.

In this position of the mechanism the tool 137 initially engages the work on the outer side of the bead-core structure 27, where it presses the marginal portion of the fabric plies thereagainst, as is shown in Figure 11. Under the sheave 136 the tool 137 bears against the drum upon the rounded shoulder thereof, radialy outwardly of the bead-core structure 27, as is shown in Figure 12. The tool 137 is drawn taut over the work between the two sheaves, and functions in the same manner as the tool 75 in rolling the fabric into place about the bead structure.

The arrangement is such that but one revolution of the drum is required for folding the fabric over the bead. Preferably the cylinders 104 of the two turn-up units are controlled by a common valve (not shown), and it will be obvious that the manipulating of the crank 120 will raise the latches 113 of the two units, so that said units will operate completely in unison.

Figure 9:
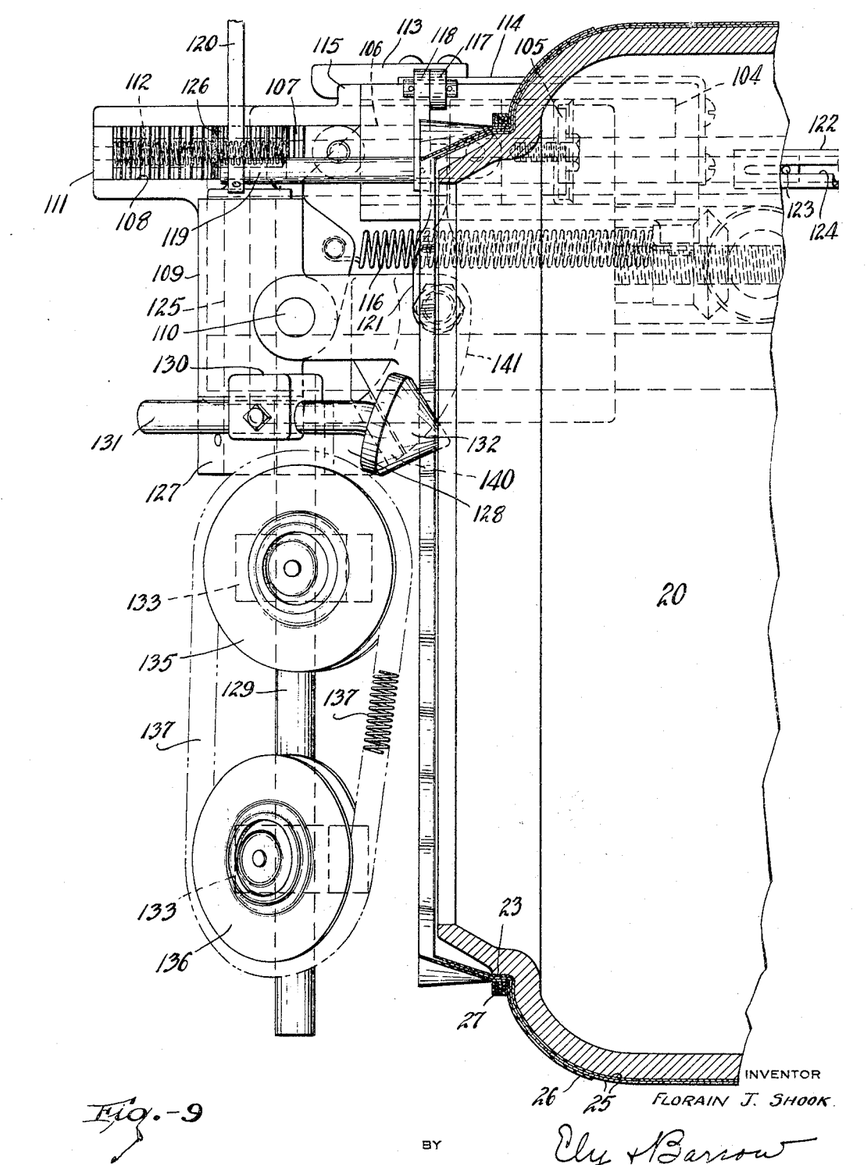
Figure 9 is a fragmentary plan view of a turn-up tool and associated mechanism including a plow during one stage of operation, the plow being shown in operative relation to the work.

To restore the turn-up unit to inoperative position it is only necessary to exhaust the pressure fluid from the cylinder 104, whereupon the spring 116 restores the lever 109 to the angular position shown in Figure 9, the latch 113 automatically engaging the lug 115. In this position of the mechanism the spring 112 is free to expand, which expansion forces the rack 107 rearwardly and restores the cylinder piston 105 to its innermost, inoperative position in the cylinder 104. The rearward movement of the rack 107 rotates the pinion 126 and shaft 125 whereby the lever 127 is turned angularly to swing the rod 129 and tool thereon into the inoperative position shown in Figures 7 and 8.

In the building of a tire upon the drum 20, after the turn-up tools have finished their work as described, the rotation of the drum is reversed and the turn-down tools again are brought into engagement with the work for the purpose of pressing the fabric plies firmly into the inside corners defined by the outer periphery of the beads 27 and the shoulders of the drum, as indicated at 140 in Figures 10 and 12.

In completing the building of the tire carcass the over-bead plies are mounted on the drum, and the turn-down tool A is caused to operate in the same manner as it does upon the under bead plies. The rotation of the drum is then reversed, and the turn-up tool B is brought into engagement with the work to fold the margins of the over-bead plies down around the beads.

The respective stitching devices are of simple construction, they perform a complete stitching operation in one revolution of the drum, they full or compact the fabric plies as they operate thereon, and they achieve the other objects set forth in the foregoing statement of objects.

Figures 14, 15, 16:
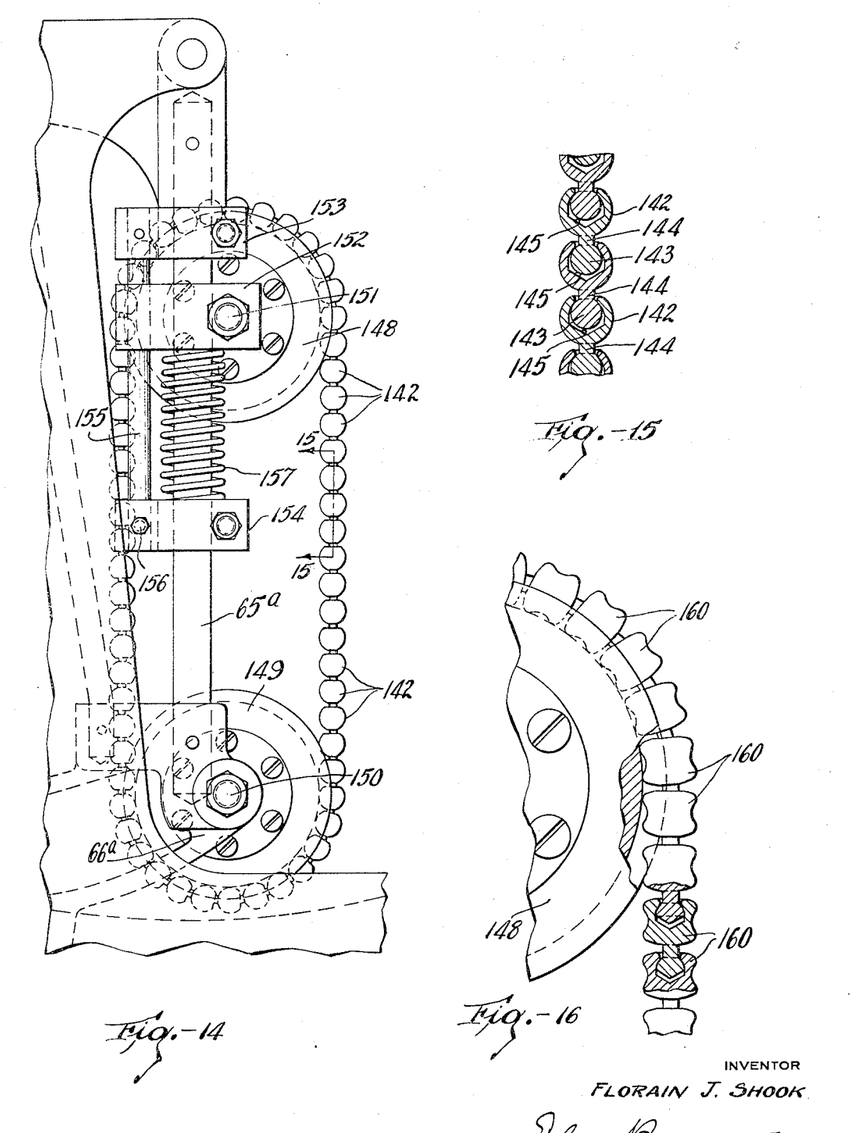
Figure 14 is an elevation of a modified stitching tool.
Figure 15 is a section on the line 15—15 thereof.
Figure 16 is a fragmentary detail view of another modified stitching tool, a part thereof being in section.

The modified stitching tool shown in Figure 14 functions in substantially the same manner as the previously-described tools. It is not inherently extensible and thus yielding means is required for holding it under tension. As shown in Figures 14 and 15, the modified tool comprises an endless flexible structure made up of a multiplicity of spherical members 142, 142 that are linked together by ball and socket connections which permit substantially universal movement of one spherical member with relation to its adjacent member. The ball and socket connection comprises a ball 143 formed integral with each member 142 by a restricted neck 144, each ball being received in a recess 145 formed in the adjacent spherical member 142, the mouth of the recess 145 being constricted so as to retain the ball therein.

The endless stitching tool is trained about a pair of grooved sheaves 148, 149, and may be used as a turn-down tool like the tool 75, or it may be used as a turn-up tool like the tool 137. It is shown in Figure 14 as a turn-down tool, the sheave 149 being journaled upon a stub shaft 150 carried by the slipper 66ª, and the sheave 148 being journaled upon a stub shaft 151 that is mounted in a block 152 that is slidably mounted upon the rod 65ª. Adjustably clamped upon rod 65ª each side of block 152 are blocks 153, 154, and a guide rod 155 is fixedly secured at one end in block 153, extends with a sliding fit through block 152, and has its other end adjustably connected to block 154 by a set screw 156. A compression spring 157 is mounted upon the rod 65ª between the blocks 153, 154, the arrangement being such that the sheave 148 normally is urged away from sheave 149 and thus keeps the endless tool taut. The feature of the guide rod 155 makes the blocks 152, 153, and 154 angularly adjustable as a unit which permits the sheaves 148, 149 to be angularly positioned with relation to each other.

In Figure 16 is shown another modified form of stitching tool consisting of an endless, flexible structure made up of a multiplicity of individual members 160, 160 that are connected to each other with ball and socket connections in substantially the same manner as the members 142 shown in Figure 15. The members 160 differ from the spherical members 142 in that they are centrally constricted or waisted in a plane transverse to their axes. In this embodiment of the invention the points of contact of the stitching tool with the work will be closer together than in the first-described modification.

Other modifications may be resorted to without departing from the spirit of the invention, or the scope of the appended claims which are not limited wholly to the specific construction shown or exact procedure described.

What is claimed is:

1. The method of building pneumatic tire casings which comprises mounting fabric plies upon the tread portion of an annular tire building form, rotating the form, and then pressing the marginal portions of the fabric onto the form, laterally of the tread portion thereof, by rolling pressure applied locally to an entire transverse region to be pressed, said region being obliquely disposed with relation to the movement of the form, and the rolling progressing in a direction substantially normal to its line of contact with the fabric.

2. The method of building pneumatic tire casings which comprises mounting fabric plies upon a shouldered tire building form, rotating the form, and then folding the marginal portions of the fabric plies over the shoulders of the form and pressing them onto the bead-seat portions thereof by rolling pressure applied locally to an entire transverse region of the fabric to be pressed, said region being obliquely disposed to the movement of the form, and the rolling progressing in a direction substantially normal to its line of contact with the fabric.

3. A method as defined in claim 2 including the fulling or compacting of the marginal portions of the fabric plies as they are pressed onto the form.

4. Tire building apparatus comprising an annular tire building form adapted to receive plies of tire building fabric, means for rotating said form, and means for pressing the marginal portions of the fabric onto the form, laterally and inwardly of the tread portion thereof, by rolling pressure applied locally to an entire transverse region of the fabric to be pressed, said region being obliquely disposed with relation to the movement of the form, and the rolling progressing in a direction substantially normal to its line of contact with the fabric.

5. Tire building apparatus comprising an annular, shouldered, tire building form adapted to support plies of tire building fabric, means for rotating the form, and a tool for folding the marginal portions of the fabric over the shoulders of the form and pressing them onto the bead-seat portions thereof by rolling pressure applied locally to an entire transverse region of the fabric to be pressed, said region being obliquely disposed with relation to the movement of the form, and the rolling progressing in a direction substantially normal to its line of contact with the fabric.

6. A combination as defined in claim 5 in which the tool for rolling down the fabric is so constructed and arranged as concurrently to effect a fulling or compacting of the fabric as it is pressed onto the form.

7. Tire building apparatus comprising an annular tire building form adapted to receive plies of tire building fabric upon the tread portion thereof, means for rotating the form, and a stitching element having a longitudinal reach thereof extending over the form obliquely to the course of movement of the form so as to have a progressive stitching action on the fabric on the form to shape the fabric about the form, said element being rotatable about its longitudinal axis, to apply rolling pressure to the fabric as it is being shaped, in a direction substantially normal to the longitudinal reach of the element.

8. Tire building apparatus comprising an annular tire building form adapted to receive plies of tire building fabric upon the tread portion thereof, means for rotating the form, and a stitching element having a longitudinal reach thereof extending over the form obliquely to the course of movement of the form so as to have a progressive stitching action on the fabric on the form to shape the fabric about the form, said element rolling in a direction normal to the oblique line of contact and in the general direction in which the fabric is being progressively shaped by the stitcher.

9. Tire building apparatus comprising a stitching tool consisting of an endless, flexible structure having helically disposed working points for contact with a rotatable tire structure, and a pair of sheaves adapted to support said tool obliquely with relation to the direction of rotation thereof.

10. Tire building apparatus comprising a stitching tool consisting of an endless, flexible structure having a succession of helical convolutions for contact with a rotatable tire, and a pair of sheaves adapted to support said tool obliquely with relation to the direction of rotation thereof.

11. Tire building apparatus comprising a stitching tool consisting of an endless, flexible, extensible structure having a succession of helical convolutions thereon for contact with a tire, and a support for said tool, said support being so constructed and arranged as to permit rotation of the tool on its longitudinal axis as it moves parallel to said axis, relatively of said support.

12. A combination as defined in claim 9 in which the support comprises a pair of sheaves.

13. Tire building apparatus comprising a rotatable, annular, tire building form having a rounded shoulder at a lateral margin thereof, a stitching tool driven by the form and consisting of an endless, flexible, elastic structure, and means for applying the tool to the form in such a manner that in being moved longitudinally by the form the tool travels obliquely across the shoulder of the form in operative engagement therewith.

14. Tire building apparatus comprising a rotatable, annular, tire building form for supporting tire building material, said form having a reduced marginal portion constituting a shoulder, a stitching tool consisting of an endless, flexible, elastic structure, a pair of sheaves supporting said tool, and means for moving the tool so that one reach thereof obliquely engages the form, one end of said reach engaging the reduced marginal portion of the form so as to be driven thereby at slower speed than the other end of said reach whereby there is a compacting of the tool in the reach that engages the form and a consequent fulling of the fabric as it is pressed to the form by the tool.

15. Tire building apparatus comprising a stitching tool consisting of an endless, flexible structure that is round in transverse section, and a pair of grooved sheaves supporting said structure.

16. A combination as defined in claim 15 including means for positioning the sheaves angularly with relation to each other.

17. Tire building apparatus comprising a stitching tool consisting of an endless, flexible, extensible structure that is round in transverse section, and a pair of grooved sheaves supporting said structure, said sheaves being disposed at an angle to each other.

18. Tire building apparatus comprising a stitching tool consisting of an endless coiled spring, and means for supporting the same in contact with a rotatable tire building form whereby the spring is rotated about its longitudinal axis and concurrently moved parallel to said axis.

19. Tire building apparatus comprising a stitching tool consisting of an endless, flexible structure, a pair of sheaves supporting said structure, and means for moving said tool into engagement with a rotatable tire building form in oblique relation to the movement of said form.

20. Tire building apparatus comprising a stitching tool consisting of an endless, flexible, extensible structure, a pair of sheaves supporting said structure, and means for moving said tool into engagement with a rotatable, shouldered, tire building drum whereby one of said sheaves is positioned nearer the axis of the drum than the other.

21. In tire building apparatus, the combination of a stitching tool consisting of a round, endless, extensible structure, a pair of grooved sheaves supporting the same, a pivotally mounted rod upon which at least one of said sheaves is adjustably mounted, and means for oscillating the rod to move the tool into and out of operative relation to the work.

22. In tire building apparatus, the combination of a stitching tool consisting of a round, endless, structure, a pair of grooved sheaves supporting the same, a rod upon which said sheaves are mounted, a support upon which said rod is pivotally mounted, power means on said support for oscillating said rod to move the tool into and out of operative relation to the work, and means for tilting said support about a horizontal axis.

23. A combination as defined in claim 22 including a turntable upon which the support is mounted, said turntable being adjustable angularly about a vertical axis.

24. In tire building apparatus, the combination of a stitching tool consisting of a round, endless structure, a pair of grooved sheaves about which said structure is trained, a rod upon which said sheaves are mounted, a support upon which said rod is pivotally mounted, power means on said support for oscillating said rod to move the tool into and out of operative relation to a tire structure on a rotatable tire building drum, a turntable upon which said support is pivotally mounted upon a horizontal axis that is disposed transversely with relation to the axis of the drum, and a carriage upon which said turntable is mounted for rotary movement about a vertical axis.

25. A combination as defined in claim 24 including means for moving the carriage laterally of the drum, parallel to the axis thereof.

26. In tire building apparatus, the combination of a stitching tool, a rod upon which said tool is carried, means for imparting orbital movement to the rod to move it from a point relatively remote from the work to a point adjacent the work, and means for imparting oscillating movement to the rod so as to swing the tool angularly into engagement with the work.

27. A combination as defined in claim 26 in which the means for imparting orbital movement and oscillating movement to the rod is a single instrumentality.

28. In a tire building apparatus, the combination of a stitching tool, a rod upon which said tool is carried, a lever supporting said rod, a shaft supporting said lever, an angularly movable bearing for said shaft, means for rotating said shaft, and means for angularly moving said bearing.

29. A combination as defined in claim 28 in which the means for rotating the shaft and for angularly moving the shaft bearing is a single instrumentality.

30. In tire building apparatus, the combination of a stitching tool, a rod upon which said tool is mounted, a lever supporting said rod, a shaft supporting said lever, an angularly movable bearing for said shaft, gear means for rotating said shaft, and a single power means for operating said gear means and for angularly moving said bearing.

31. A combination as defined in claim 30 in which the power means is a fluid pressure cylinder so constructed and arranged as to utilize one part of its operative movement in operating the gear means and another part in angularly moving the shaft-bearing.

32. In tire building apparatus, the combination of a stitching tool, a member upon which said tool is supported, a lever supporting said member, a shaft supporting said lever, a pivotally mounted bearing for said shaft, latch means normally holding said bearing in determinate angular position, gear means for rotating the shaft, and power means for operating said gear means to rotate the shaft, and to move the shaft-bearing angularly when the latch means is released.

33. A combination as defined in claim 32 including yielding means for restoring the shaft-bearing to normal latched position after the power means becomes inoperative.

34. In tire building apparatus, the combination of a stitching tool, a rod upon which said tool is mounted, a lever supporting said rod, a shaft supporting said lever, a bearing for said shaft that is pivotally mounted upon an axis transverse to the axis of the shaft, latch means for holding the shaft bearing in determinate angular position, a pinion on said shaft, a rack meshed with said pinion, and a fluid pressure cylinder connected to said rack for moving the same, and for moving the shaft bearing when the latch means is released.

35. In tire building apparatus, the combination of a tire-working tool, and means for moving the same into engagement with a tire, said means comprising a fluid pressure operated cylinder including a piston, and a rack having pivotal connection with said piston.

36. A combination as defined in claim 35 in which the pivotal connection comprises a link that is pivotally connected to the piston and to the rack.

37. Tire building apparatus comprising a stitching tool consisting of an endless, flexible structure made up of a multiplicity of units that are of round form and are so connected to each other as to permit substantially universal relative movement between adjacent units, and a pair of grooved sheaves supporting said structure.

38. A combination as defined in claim 37 including ball and socket connections between adjacent units of the endless structure.

39. A combination as defined in claim 37 including yielding means for urging the sheaves apart so as to tension the endless structure.

40. A combination as defined in claim 37 in which the units of the endless structure are centrally constricted or waisted.

FLORAIN J. SHOOK.